(12) United States Patent
Niknafs

(10) Patent No.: US 6,387,534 B1
(45) Date of Patent: May 14, 2002

(54) RANDOM PACKING ELEMENT

(75) Inventor: Hassan S. Niknafs, Stow, OH (US)

(73) Assignee: Saint-Gobain Norpro Corporation, Stow, OH (US)

( * ) Notice: Subject to any disclaimer, the term of this patent is extended or adjusted under 35 U.S.C. 154(b) by 57 days.

(21) Appl. No.: 09/713,371

(22) Filed: Nov. 14, 2000

(51) Int. Cl.⁷ .............................. B32B 3/10; B01F 3/04
(52) U.S. Cl. ...................... 428/596; 428/544; 428/597; 261/95; 261/DIG. 72
(58) Field of Search .................... 428/98, 596, 544, 428/597; 261/94, 95, DIG. 72

(56) References Cited

U.S. PATENT DOCUMENTS 4,425,285 A * 1/1984 Shimoi et al. ....... 261/DIG. 72

* cited by examiner

Primary Examiner—Alexander S. Thomas
(74) Attorney, Agent, or Firm—David Bennett

(57) ABSTRACT

The invention provides a novel improved packing element having the basic shape of a polygon with arches formed around the periphery by deforming the edge area in one direction and an area axially within the edge area to form arches projecting in the opposite direction and providing an axially located aperture. Such packing elements can be conveniently formed using a simple cutting and stamping operation.

11 Claims, 2 Drawing Sheets

RANDOM PACKING ELEMENT

BACKGROUND OF THE INVENTION

This invention relates to packing elements of the type that are often called "random" or "dumped" packings. Such packings are used to fill towers units in which mass or heat transfer processes occur. The objective of the packings is to provide maximum effective contact between fluids flowing in the tower. Maximum efficiency is achieved when liquid flows down the tower in thin films or small droplets rather than in streams. Another key factor in maximizing efficiency is the maintenance of as low a pressure difference between top and bottom of the tower as possible. To ensure this the packing elements should present the minimum resistance to flow. This is promoted by very open structures but open structure alone is of limited use if the elements in the tower nest together such that parts of one packing element penetrate within the space of a second element. It is therefore important that the design of the elements minimize the tendency of the elements to nest together.

A novel design for a packing element has now been found that provides greater than 95% of open space within the element and still resists nesting of the elements which reduces the open space and promotes uniform flow and turbulent mixing of fluids within a tower filled with the packings.

The design has the advantage that the packing can, if desired, be stamped from a flat sheet of metal in a simple operation to produce a very open shape that resists crushing and nesting. The shapes can however be made from plastic or ceramic.

DESCRIPTION OF THE INVENTION

The present invention provides a packing element in the form of a basic sheet of material located in a first plane and having the form of a polygon with 3 to 6 corners from which a first group of spaced peripheral strips between each of the corners of the sheet are deformed in a first direction to form arched structures with the apices of at least some of the arches in a second plane parallel to the first plane and removed therefrom in the first direction, and second group of parallel strips equal in number and parallel to the corresponding strips in the first group but each being displaced radially inwardly from the corresponding strip from the first group, each strip being deformed out of the first plane in a second direction which is generally opposite to the first direction to form arches with apices at least some of which are in a third plane parallel to the first plane, and an axially central aperture formed in the sheet and defined by a generally circular periphery.

The arches can be integral with the sheet and formed by slitting the sheet to form strips which are then deformed out of the sheet mechanically. Alternatively the arches may be welded or otherwise adhered to the basic sheet to form the same structure though this is a less simple manufacturing procedure using present technology. The arches formed can be described as extending generally above and below the first plane but the plane of each arch need not be perpendicular to the first plane and indeed it is often preferred that this is not so. For this reason the direction of deformation of the inner set of strips is described as being "generally opposite" from the first direction in which the outer set of strips were deformed. This is intended however only to require that the apices of the two groups of arches lie on different sides of the first plane.

The basic sheet upon which the packing element is constructed is preferably axially symmetrical with sides of equal length. The preferred number of equal length sides is three.

In a preferred structure the lengths of each of the second group of parallel strips from which arches are formed are shorter than the corresponding adjacent strips from the first group of strips. Thus the arches formed from the second set of strips are preferably smaller than those formed from the first set of strips. It is also preferred that the arches within each group be substantially the same size such the apices of all the arches within a group lie in the same plane parallel to and displaced from the first plane.

The axially located aperture is defined by a periphery and is preferably provided with tongue members which project from the periphery in the first direction.

Apertures defined by a generally circular periphery are also preferably located adjacent at least some of the corners of the polygonal sheet. These also are provided with tongues dependent in the first direction from the periphery of the corner apertures.

The tongues depending in the first direction from the periphery of both the axial and corner apertures preferably have the shape of triangles and most preferably the triangles are equilateral or have two equal sides with the shortest side at the periphery of the aperture.

The tongues not only provide excellent means of breaking up stream flows into a series of drips but they also generate turbulence in gas flows passing therethrough and so enhancing the efficiency of the contact between counterflowing fluids.

The shapes described herein are particularly effective because they have greater than 95% internal open space ensuring a very low pressure drop while at the same time resisting nesting and deformation under pressure.

The packing elements are preferably made of metal and preferably this is a metal capable of resisting corrosive environments such as stainless steel. Because of the design, it is possible to use relatively thin gauge metal thus saving volume and weight while still achieving a very robust and effective packing element. It should be recognized however that plastic and in some instances ceramic could be a more preferred material depending on the expected environment in which are to be used.

The invention further comprises a process for the production of a packing element according to the invention which comprises providing a polygonal sheet of metal with from 3 to 6 corners and symmetrical about an axis perpendicular to the sheet:

a) incising a first group of cut lines, each of which is adjacent to, parallel to and equidistant from one of the sides of the sheet to form a first group of strips each located between an edge of the sheet and a cut line;

b) incising a second group of cut lines, each line being adjacent to, parallel to, and equidistant from one of the lines of the first group of cut lines to form a second group of strips parallel to the first;

c) incising a group of cut lines of equal length radiating from the axis of the sheet;

and then applying pressure to the sheet to deform the sides of the sheet between the edges and the first cut lines in a first direction to form arches; deforming the strips between the first and second cut lines in a diametrically opposite direction to said first direction to form arches, and bending the portions of the sheet between adjacent lines of those cut radially from the axis of the sheet so as to form a plurality of dependent tongues projecting in the first direction from the periphery of an aperture in the sheet.

In a preferred process each of the corners of the polygonal sheet is provided with a pattern of cut lines of equal length radiating from a point adjacent each corner and the portions of the sheet between adjacent radial cut lines is bent in the first direction such that an aperture is formed with a circle of triangular tongues depending in the first direction from the periphery of the aperture.

DRAWINGS

DESCRIPTION OF THE PREFERRED EMBODIMENT

Figure 1:
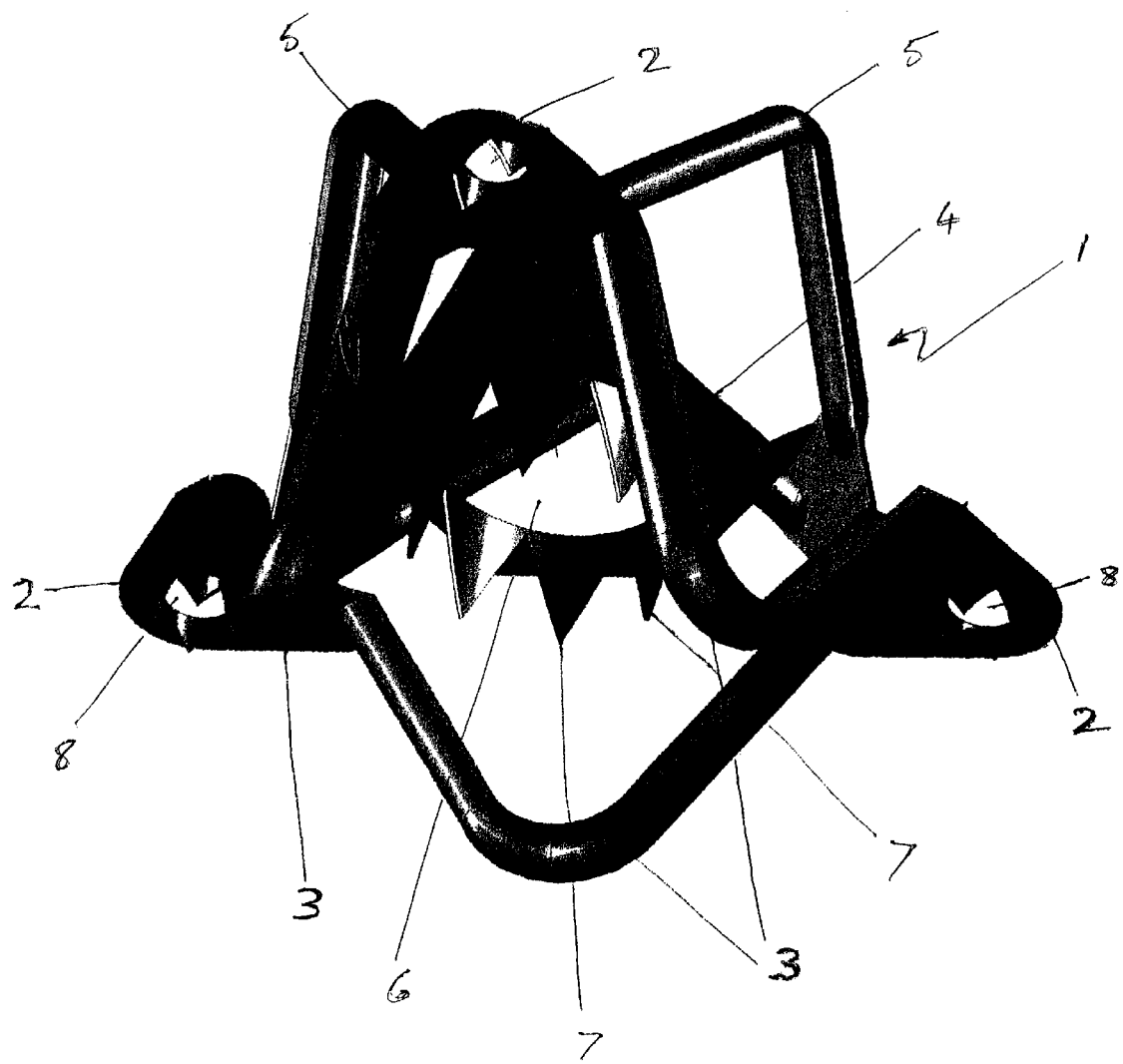
FIG. 1 is a perspective view of a packing element of the invention from a point below and to one side, looking directly at one of the corners of the triangular element.
Figure 2:
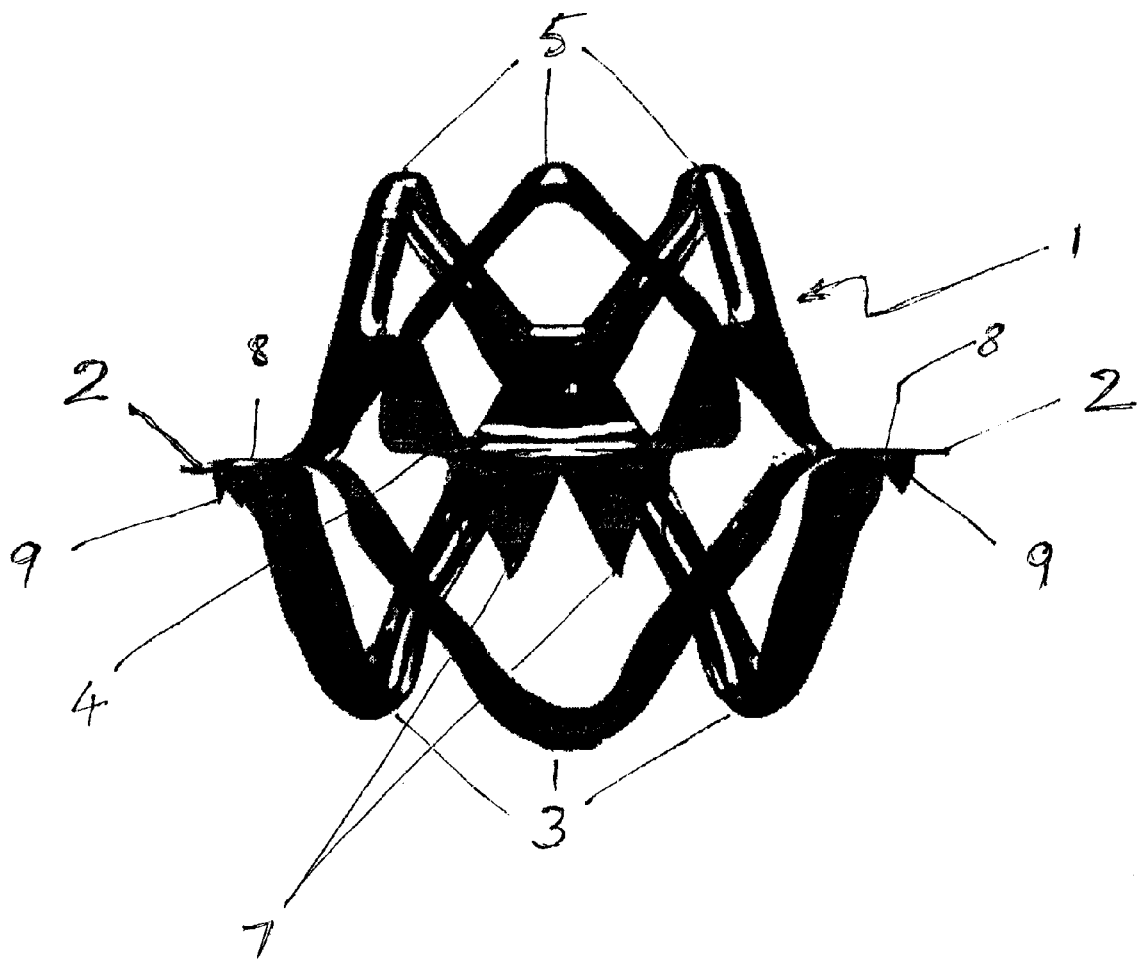
FIG. 2 shows the same element as is shown in FIG. 1 from the side, this time looking directly at the mid-point of one of the sides of the element.

The invention is now more particularly described with reference to the embodiment illustrated in the Drawings. This is not intended to imply any necessary limitations in the scope of the invention because it will be readily appreciated that many minor variations could be made without departing from the essential spirit of the invention.

The Drawings show a triangular packing element, 1, with three corners, 2. Along each of the three edges of the sheet a strip has been deformed downwards to form an arch, 3, each arch being of essentially the same dimensions. The portion of the sheet located axially inwardly of the outer arched strips, 3, is deformed in a direction diametrically opposite to the outer strips and an inner portion, 4, is deformed in the first direction back into the original plane of the sheet, leaving three arches, 5. The axially central portion of the sheet is provided with a generally circular aperture, 6, from the periphery of which tongues, 7 depend in the first direction. Adjacent each of the corners of the sheet apertures, 8, have been formed with tongues, 9, projecting in the first direction from around the periphery of each aperture.

The arched members, 3 and 5, are formed with U-shaped cross sections since these give an enhanced level of strength against deformation.

The apices of each of the arches in each group lie in the same plane, though it is noted that the arches formed by deformation in the second direction are smaller than those formed by deformation in the first direction.

What is claimed is:

1. A packing element in the form of a sheet located in a first plane and having the form of a polygon with 3 to 6 corners from which a first group of spaced peripheral strips between each of the corners of the sheet are deformed in a first direction to form arched structures with the apices of at least some of the arches in a second plane parallel to the first plane and removed therefrom in the first direction, and second group of parallel strips equal in number and parallel to the corresponding strips in the first group but each being displaced radially inwardly from the corresponding strip from the first group, each strip being deformed out of the first plane in a second direction diametrically opposite to the first direction to form arches with apices at least some of which are in a third plane parallel to the first plane, and an axially central aperture formed in the sheet and defined by a generally circular periphery.

2. A packing element according to claim 1 in which the polygon is an equilateral triangle.

3. A packing element according to claim 1 in which the strips in the second group of parallel strips are each shorter than the adjacent strip from the first group of strips such that the arches formed therefrom are smaller than those formed from the strips in the first group of strips.

4. A packing element according to claim 1 in which the axially central aperture is defined by a periphery and pendant from said periphery in said first direction are a plurality of tongues.

5. A packing element according to claim 1 in which apertures are provided adjacent at least some of the corners of the sheet each aperture being defined by a periphery and having a plurality of tongues pendant from the periphery in the first direction.

6. A packing element according to claim 1 in which the sheet is made from a material selected from metal, plastic or ceramic.

7. A packing element according to claim 6 in which the material is stainless steel.

8. A method of making a packing element which comprises:

a) providing a polygonal sheet with from 3 to 6 corners and symmetrical about an axis perpendicular to the sheet:

b) incising a first group of cut lines, each of which is adjacent to, parallel to and equidistant from one of the sides of the sheet to form a first group of strips each located between an edge of the sheet and a cut line;

c) incising a second group of cut lines, each line being adjacent to, parallel to, and equidistant from one of the lines of the first group of cut lines to form a second group of strips parallel to the first;

d) incising a group of cut lines of equal length radiating from the axis of the sheet;

e) and then applying pressure to the sheet to deform the sides of the sheet between the edges and the first cut lines in a first direction to form arches; deforming the strips between the first and second cut lines in a diametrically opposite direction to said first direction to form arches, and bending the portions of the sheet between adjacent lines of those cut radially from the axis of the sheet so as to form a plurality of dependent tongues projecting in the first direction from the periphery of an aperture in the sheet.

9. A process according to claim 8 in which the polygon has the form of an equilateral triangle.

10. A process according to claim 8 in which apertures with tongues pendant in the first direction are formed adjacent each of the corners of the sheet.

11. A process according to claim 8 in which the material from which the element is made is metal.

\* \* \* \* \*